H. H. RODGERS.
SURVEYOR'S INSTRUMENT.
APPLICATION FILED NOV. 11, 1915.
1,262,985.
Patented Apr. 16, 1918.
2 SHEETS—SHEET 1.
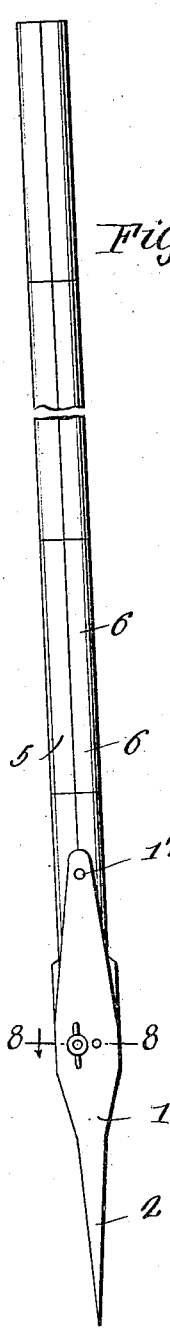
Fig. 1.
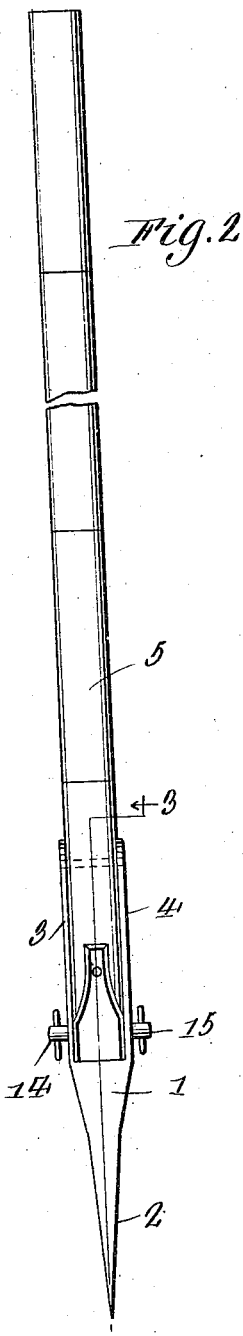
Fig. 2.
Fig. 3.
WITNESSES
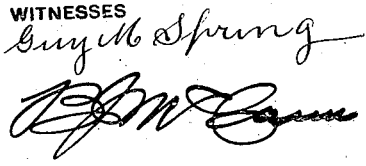
INVENTOR
Harry H. Rodgers.
BY 
ATTORNEY H. H. RODGERS.
SURVEYOR'S INSTRUMENT.
APPLICATION FILED NOV. 11, 1915.
1,262,985.
Patented Apr. 16, 1918.
2 SHEETS—SHEET 2.
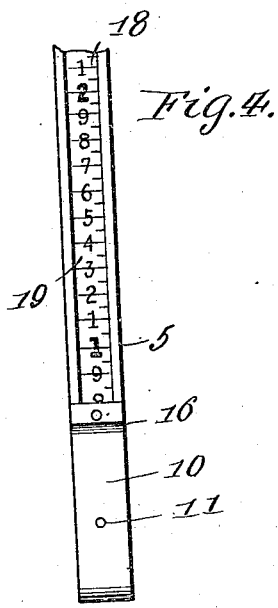
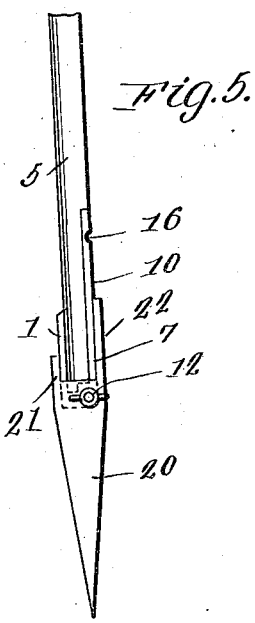
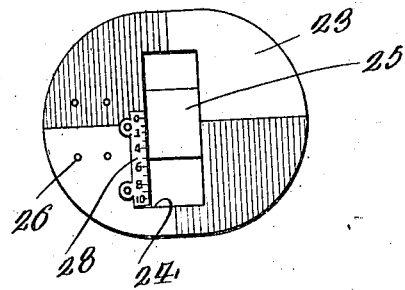
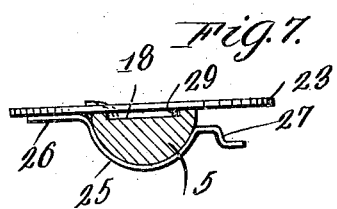
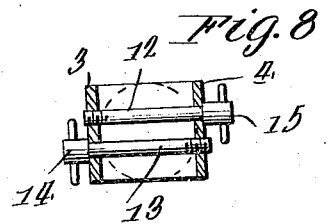
INVENTOR
Harry H. Rodgers.
WITNESSES
Guy M. Sprung
B. J. McCann
BY Richard B. Owen.
ATTORNEY

UNITED STATES PATENT OFFICE.

HARRY H. RODGERS, OF ALTON, ILLINOIS.

SURVEYOR'S INSTRUMENT.

1,262,985.  Specification of Letters Patent.  Patented Apr. 16, 1918.

Application filed November 11, 1915. Serial No. 60,909.

*To all whom it may concern:*

Be it known that I, HARRY H. RODGERS, a citizen of the United States, residing at Alton, in the county of Madison and State of Illinois, have invented certain new and useful Improvements in Surveyors' Instruments, of which the following is a specification.

My invention relates to surveyors' instruments and more particularly to an improved form of leveling rod.

My invention has for its primary object the provision of an improved leveling rod and range pole for use by surveyors and civil engineers in connection with the usual level and transit.

Another object of the invention is to provide a range pole and a leveling rod having a plurality of sections hingedly connected which allows the use of the rod in its usual capacity as a linear measure.

Another object of the invention is to provide an improved target for use in connection with the leveling rod.

With the above and other objects in view my invention resides preferably in the construction, combination and arrangement of parts as hereinafter set forth in the specification and illustrated in the accompanying drawings, in which, Figure 1 is a side elevational view of a leveling rod embodying the improvements of my invention.

Fig. 2 is a similar view looking at right angles to the view in Fig. 1.

Fig. 3 is a similar view, the same being broken away and in section taken on the line 3—3 of Fig. 2, looking in the direction of the arrow.

Fig. 4 is a fragmentary elevational view of one end of one of the sections forming a part of my invention.

Fig. 5 shows a modified form of my invention.

Fig. 6 is a plan view of an improved target which I employ in the preferred embodiment of my invention.

Fig. 7 is a side elevational view of the same showing it applied to the leveling rod, and Fig. 8 is a transverse sectional view taken on the line 8—8 of Fig. 1 looking in the direction of the arrow, the sections of the leveling rod being omitted.

Similar reference characters designate similar parts throughout the various views of the drawings.

In the drawings, I have illustrated my improved leveling rod which includes a main shoe or stake 1 having a tapering portion 2 penetrable into the earth or some stationary object. The upper extremity of the stake 1 is bifurcated to provide spaced arms 3 and 4 between which a pair of rod sections 5 and 6 are pivotally mounted.

The adjacent extremities of the sections 5 and 6 of the leveling rod are carried in hinges 7 and 8 provided with spaced arms 9 and 10, respectively, between which said sections 5 and 6 are mounted, and a plurality of retaining rivets or the like 11 are provided. The hinges 7 and 8 are apertured to receive transversely extending pins 12 and 13. The pins 12 and 13 are provided with operating handles 14 and 15 and are threaded on their free extremities for engagement with the arms 3 and 4, respectively. The pins 12 and 13 are inserted through suitable apertures in the arms 3 and 4 in opposite directions so as to allow the same to be brought into close relation and still allow the use of the operating handles 14 and 15.

The adjacent arms 9 and 10 of the hinges 7 and 8 are provided with transversely extending grooves 16 which are adapted to embrace the stop pin 17 carried by the arms 3 and 4 of the stake 1.

The sections 5 and 6 are substantially semi-circular in cross section, as shown to advantage in Fig. 7, the straight faces thereof being grooved, as indicated at 18 in said Fig. 7, and provided with a scale 19 in tenths of a foot or the like. The scale 19 may be used when finding the center of a "cut" or the like, by moving the sections 5 and 6 to a substantially horizontal plane within the cut and laying off on the scale the proper measurement.

When using the device in the ordinary capacity of a leveling rod only one of the sections need be used. In this manner one of the pins 12 or 13 may be removed allowing the section held thereby to be removed. When using the device in the ordinary capacity of a surveyor's rod, sections 5 and 6 are held by the shoe 1 as in Fig. 1 or sections may be used separately. I provide a supplemental shoe 20 having a tapering extremity and provided with spaced arms 21 and 22 adapted to receive the hinge of one of the sections 5 or 6 therebetween. This structure is shown to advantage in Fig. 5 wherein the section 5 has been removed from the stake 1 and inserted in the supplemental shoe 20. One of the pins, in this instance, the pin 12 has been removed from the shoe 1 and is inserted through the hinge 7 in order to retain said shoe on said section.

I provide a target and means for retaining the same on the leveling rod, said target being shown to advantage in Figs. 6 and 7. The target is designated 23 and is provided with the usual colored sections on one face thereof. The target 23 is provided with a substantially rectangular aperture centrally thereof, designated 24, said aperture allowing a view of the scale 19 when using the device as a leveling rod. I provide improved retaining means for said target which includes a semi-circular flat spring 25 riveted at one extremity, as indicated at 26, to the rear face of the target 23, the free extremity of said spring having a finger portion or grip formed thereon, as shown at 27. The semi-circular portion of the strip is adapted to embrace the section 5, as shown to advantage in Fig. 7. Along one marginal edge of the openings 24 I have provided a short scale 28 for coaction with the scale 19 to obtain fractional measurements of a very minute degree. I provide a lug 29 formed on the target 23 which is adapted to ride in the groove 18 and prevent lateral movement of the target.

My invention may be used in a number of capacities, such as for finding the middle of a railroad between two embankments, for slope-staking, for use in the usual capacity of two leveling rods and range poles, and is of particular advantage when used as a leveling rod working on the edge of a cliff below the top of which there may be a narrow ledge on which an elevation must be obtained. When used as the usual range pole one of the sections 5 or 6 may be removed and used in the manner shown in Fig. 5 and hereinbefore described. A plurality of targets and shoes 20 may be provided, one for each of the sections 5 and 6, so that in my invention a pair of leveling rods and range poles are provided in a single compact structure. I desire to lay particular stress upon the double section and improved means of connecting the sections 5 and 6 to the stake 1 as well as the improved target which I provide.

From the above description taken in connection with the accompanying drawings it is thought that a clear and comprehensive understanding of the construction, operation and advantages of my invention may be readily gathered, and while I have shown and described the same as embodying a specific structure I desire that it be understood that I may make such changes therein which do not depart from the spirit and scope of the invention as claimed.

I claim:

1. A surveying and measuring instrument, including a main anchoring shoe having a bifurcated extremity affording a pair of arms, said arms provided with alining apertures, a pair of rod sections, hinges for said rod sections, and pins passing through said apertured arms and said hinges, as and for the purpose set forth.

2. A surveying and measuring instrument, including a stake, a pair of rod sections substantially semi-circular in cross section, hinges carried by said stake and having spaced arms for engagement over said rod sections.

3. A surveying and measuring instrument including an anchoring shoe, a plurality of rods, and pins removably engaged with said rods and said shoe.

4. A surveying and measuring instrument comprising an anchoring stake having spaced arms, a rod comprising a pair of sections, U shaped hinges secured to the lower ends of said sections, said U shaped hinges being pivotally secured between said spaced arms to said anchoring stake, whereby said hinges will protect the lower ends of said section and at the same time efficiently support the same.

5. A surveying and measuring instrument comprising an anchoring means, and a pair of rod sections pivotally mounted upon said anchoring means independently of each other.

6. A surveying and measuring instrument comprising an anchoring stake, a plurality of rod sections pivotally mounted upon said stake, said sections being substantially semi-cylindrical in shape, thus when said rod sections are folded together constituting a substantially cylindrical body.

7. A surveying and measuring instrument comprising a stake having spaced arms formed thereon, and rod sections pivotally mounted between said arms independently of each other.

8. A surveying and measuring instrument comprising an anchoring stake, a plurality of rod sections, U shaped hinges secured to the lower ends of said sections, said U shaped hinges being pivotally secured to said anchoring stake, whereby said hinges will protect the lower ends of said sections and at the same time efficiently support the same.

In testimony whereof I affix my signature in presence of two witnesses.

HARRY H. RODGERS.

Witnesses:
P. H. YOUNGBERG,
E. S. BETTS.

Copies of this patent may be obtained for five cents each, by addressing the "Commissioner of Patents, Washington, D. C."